(12) United States Patent
Park

(10) Patent No.: US 9,574,662 B2
(45) Date of Patent: Feb. 21, 2017

(54) DISCONNECTOR FOR HYBRID VEHICLE

(71) Applicant: HYUNDAI WIA CORPORATION, Gyeongsangnam-Do (KR)

(72) Inventor: Ki Dong Park, Gyeonggi-Do (KR)

(73) Assignee: HYUNDAI WIA CORPORATION, Gyeongsangnam-do (KR)

( * ) Notice: Subject to any disclaimer, the term of this patent is extended or adjusted under 35 U.S.C. 154(b) by 463 days.

(21) Appl. No.: 14/107,381

(22) Filed: Dec. 16, 2013

(65) Prior Publication Data

US 2015/0165892 A1 Jun. 18, 2015

(51) Int. Cl.
| F16H 61/68 | (2006.01) |
|---|---|
| B60K 6/387 | (2007.10) |
| F16H 59/70 | (2006.01) |
| F16H 63/30 | (2006.01) |
| F16D 23/14 | (2006.01) |

(52) U.S. Cl.
CPC ............... *F16H 61/68* (2013.01); *B60K 6/387* (2013.01); *F16H 59/70* (2013.01); *F16H 63/304* (2013.01); *F16D 2023/141* (2013.01); *F16H 2063/3063* (2013.01); *Y10S 903/902* (2013.01); *Y10T 74/19251* (2015.01)

(58) Field of Classification Search
CPC ...... F16H 61/68; F16H 61/682; F16H 63/304; B60K 6/547; B60K 6/387; F16D 2023/141
USPC .............................. 180/247, 248; 324/207.24
See application file for complete search history.

(56) References Cited

U.S. PATENT DOCUMENTS

| 4,341,281 | A | * | 7/1982 | Nagy | B60K 17/35 180/247 |
|---|---|---|---|---|---|
| 4,407,387 | A | * | 10/1983 | Lindbert | B60K 23/08 180/24.1 |
| 4,625,584 | A | | 12/1986 | Onodera | |
| 4,699,235 | A | * | 10/1987 | Anderson | B60K 17/35 180/247 |
| 4,788,888 | A | * | 12/1988 | Tsutsumikoshi | B60K 17/35 180/250 |
| 5,742,161 | A | * | 4/1998 | Karte | G01B 7/003 324/207.12 |
| 6,722,219 | B2 | * | 4/2004 | Berger | F16H 59/68 74/335 |
| 8,258,779 | B2 | * | 9/2012 | Wenzel | F16H 59/70 324/207.2 |
| 8,459,133 | B2 | * | 6/2013 | Inoue | F16H 25/2015 74/567 |
| 2003/0234124 | A1 | | 12/2003 | Pecnik et al. | |
| 2006/0065067 | A1 | | 3/2006 | Swanson et al. | |

(Continued)

FOREIGN PATENT DOCUMENTS

| FR | 2 742 836 | * | 6/1997 |
|---|---|---|---|
| KR | 1020090024915 A | | 3/2009 |

OTHER PUBLICATIONS

European Search Report for International Application No. EP13197375, Apr. 16, 2014, 8 Pages, Munich Germany.

*Primary Examiner* — William C Joyce
(74) *Attorney, Agent, or Firm* — Stetina Brunda Garred and Brucker; Mark B. Garret

(57) ABSTRACT

A disconnector for a hybrid vehicle, which can accurately control interruption or transmission of rotary power by accurately measuring and monitoring a transfer distance of a shift fork using a linear sensor while interrupting or transmitting the rotary power of an engine or a motor using the shift fork.

4 Claims, 5 Drawing Sheets

(56) References Cited

U.S. PATENT DOCUMENTS

2010/0041506 A1\* 2/2010 Cooper .................. F16H 48/08
                                                            475/223
2010/0242642 A1    9/2010 Ganter \* cited by examiner

DISCONNECTOR FOR HYBRID VEHICLE

BACKGROUND OF THE INVENTION

1. Field of the Invention

Aspects of the present invention relate to a disconnector for a hybrid vehicle, and more particularly, to a disconnector for a hybrid vehicle, which can accurately control interruption or transmission of rotary power by accurately measuring and monitoring a transfer distance of a shift fork using a linear sensor while interrupting or transmitting the rotary power of an engine or a motor using the shift fork.

2. Description of the Related Art

As fossil fuels are running out, development of hybrid vehicles using a combination of fossil fuel and electricity, instead of vehicles using fossil fuel such as gasoline or diesel, is underway.

The hybrid vehicle includes an engine generating rotary power by fossil fuel and a driving motor generating rotary power by electricity and is configured to interrupt or transmit the rotary power of the engine according to the necessity.

A technique of using an engine clutch to interrupt the rotary power of the engine is disclosed in Korean Patent Publication No. 10-2009-0024915 (Mar. 10, 2009), entitled "Power transmission apparatus for a hybrid vehicle." However, since the conventional hybrid vehicle uses a clutch to interrupt or transmit the rotary power of the engine, the efficiency of the engine may be lowered.

BRIEF SUMMARY OF THE INVENTION

Aspects of the present invention provide a disconnector for a hybrid vehicle, which can accurately control interruption or transmission of rotary power by accurately measuring and monitoring a transfer distance of a shift fork using a linear sensor while interrupting or transmitting the rotary power of an engine or a motor using the shift fork.

In accordance with one aspect of the present invention, there is provided a disconnector includes an upper housing connected to a reducer, an input shaft installed inside the upper housing and transmitting rotary power of the reducer, bearings installed between the upper housing and the input shaft, a hub disposed under the input shaft, a sleeve having an inner circumferential surface spline-coupled to outer circumferential surfaces of the input shaft and the hub to then be shifted to transmit or interrupt the rotary power of the input shaft to the hub, a shift fork coupled to an outer circumferential surface of the sleeve and shifting the sleeve, a first spring installed between the upper housing and the shift fork, a lower case connected to a lower portion of the upper housing, a constant velocity joint connected to the hub through the inside of the lower case, a needle roller installed between the lower case and the constant velocity joint, an actuator coupled to the inside of the lower case and pushing out the shift fork, and a linear sensor sensing a transfer distance of the shift fork.

The actuator may include a motor generating rotary power, a lead screw converting a rotary motion into a linear motion, a cover mounted at a front end of the lead screw, a second spring installed between the lead screw and the cover, and a position sensor installed to be spaced apart from one side of the lead screw.

The disconnector may further include a controller controlling a motor of the actuator of the motor according to the transfer distance of the shift fork measured by the linear sensor.

The motor may be a reversible motor.

The shift fork may have an inclined surface formed at a region positioned to correspond to the linear sensor.

As described above, according to the present invention, interruption or transmission of rotary power can be accurately controlled by accurately measuring and monitoring a transfer distance of a shift fork using a linear sensor while interrupting or transmitting the rotary power of an engine or a motor using the shift fork.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Hereinafter, examples of embodiments of the invention will be described in detail with reference to the accompanying drawings such that they can easily be made and used by those skilled in the art. Advantages and features of the present invention and methods of accomplishing the same may be understood more readily by reference to the following detailed description of preferred embodiments and the accompanying drawings.

However, the following descriptions of such embodiments are intended primarily for illustrating the principles and exemplary constructions of the present invention, and the present invention is not specifically limited to these exemplary embodiments. Thus, one skilled in the art can appreciate or recognize that various modifications, substitutions and equivalents thereof can be made thereto without departing from the spirit and scope of the present invention.

In addition, it should be understood that the terms and words used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation for the invention. For the sake of convenience, an orientation is set on the basis of illustration of figures.

Figure 1:
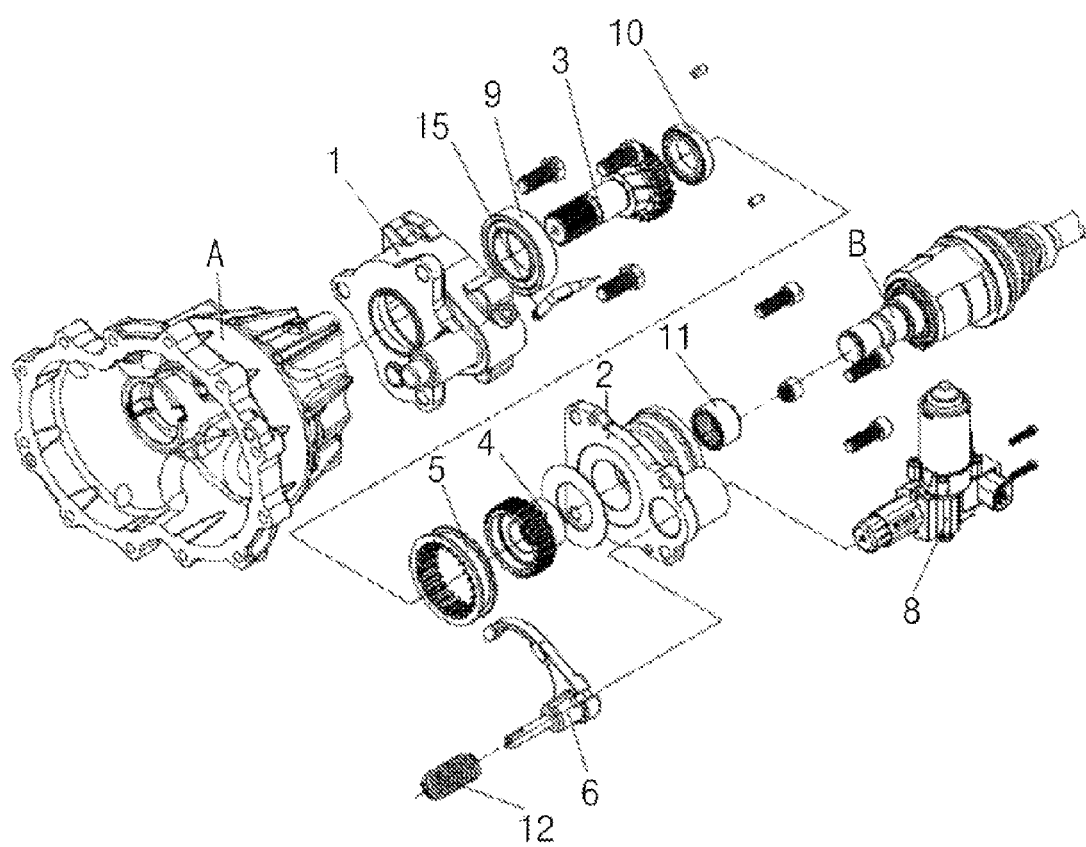
FIG. 1 is a perspective view illustrating an assembled state of a disconnector for a hybrid vehicle according to an embodiment of the present invention.
Figure 2:
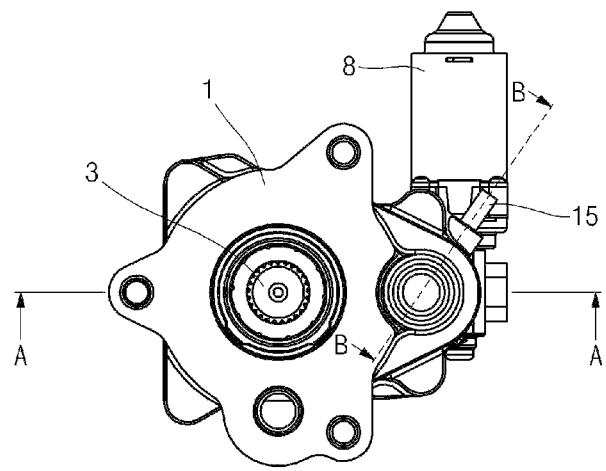
FIG. 2 is a front view of the disconnector for a hybrid vehicle shown in FIG. 1.
Figure 3:
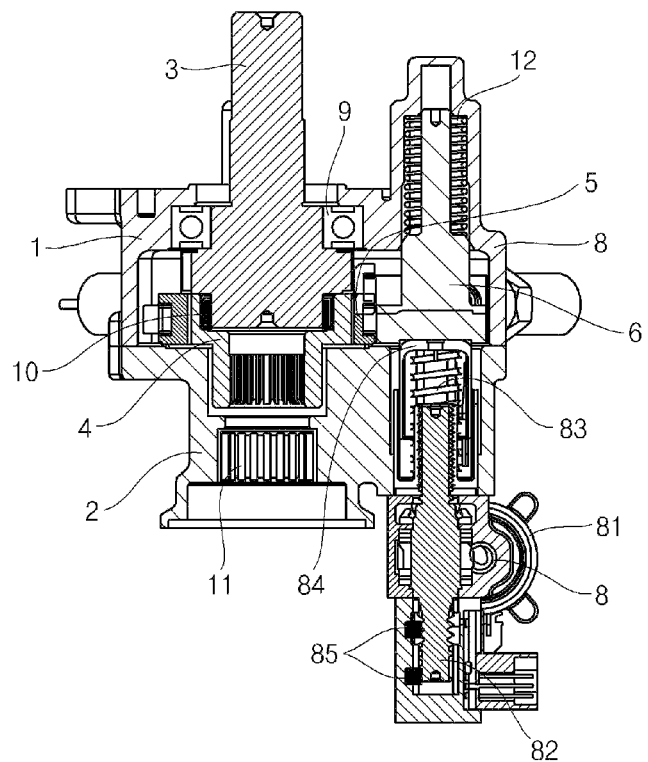
FIG. 3 is a cross-sectional view taken along the line A-A of FIG. 2.
Figure 4:
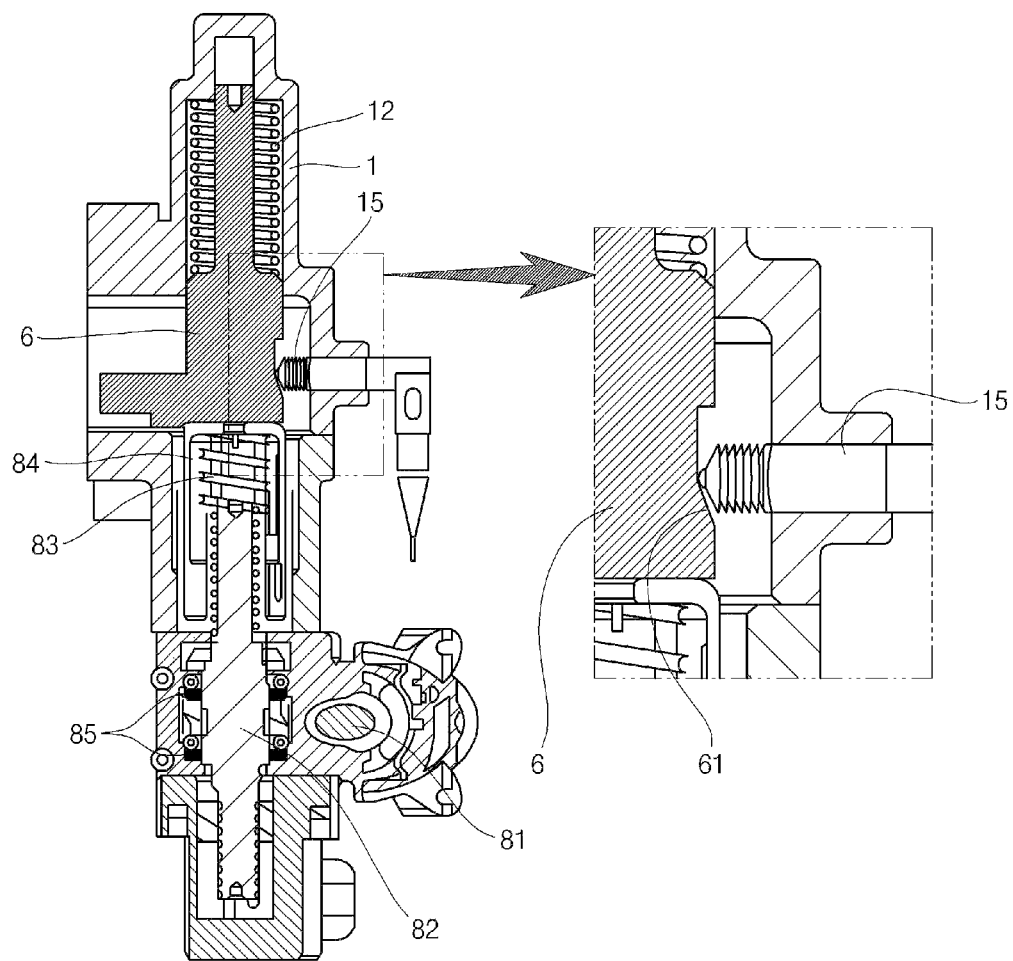
FIG. 4 is a cross-sectional view taken along the line B-B of FIG. 2, illustrating a case of interrupting power.
Figure 5:
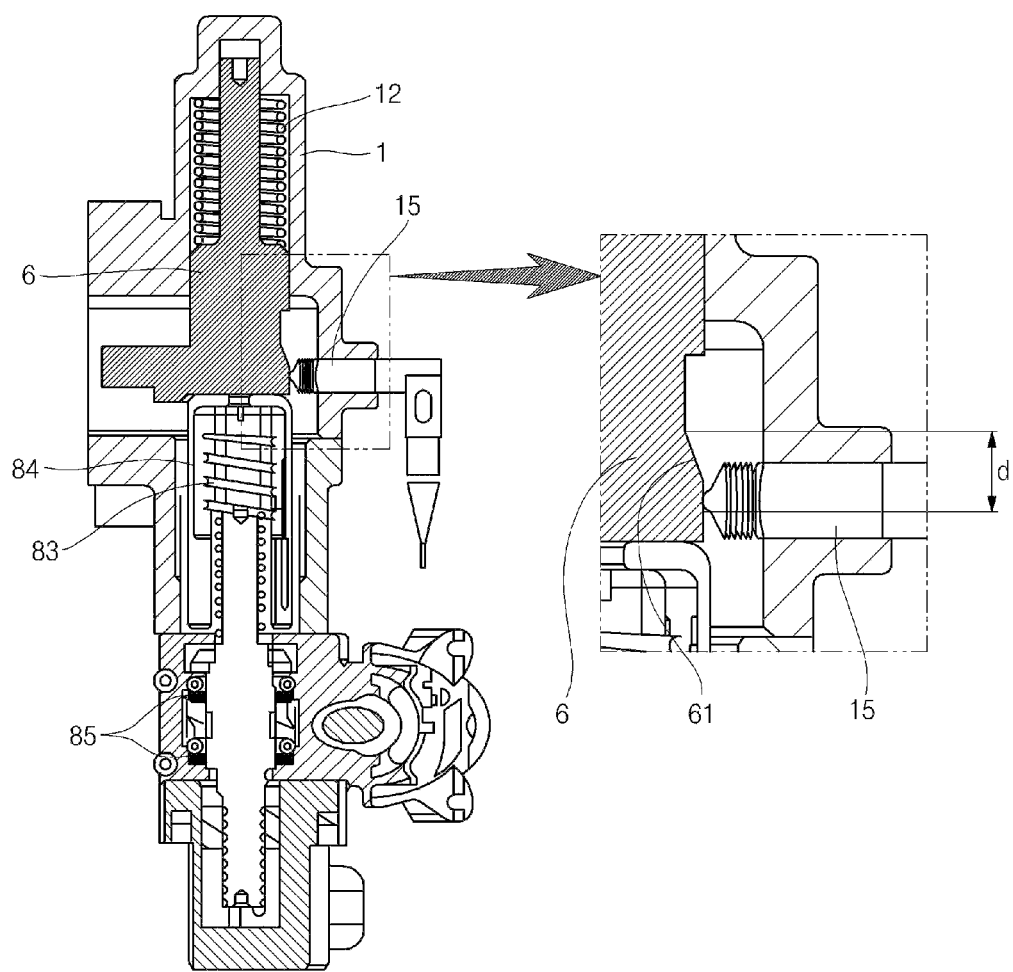
FIG. 5 is a cross-sectional view taken along the line B-B of FIG. 2, illustrating a case of transmitting power.

FIG. 1 is a perspective view illustrating an assembled state of a disconnector for a hybrid vehicle according to an embodiment of the present invention, FIG. 2 is a front view of the disconnector for a hybrid vehicle shown in FIG. 1, FIG. 3 is a cross-sectional view taken along the line A-A of FIG. 2, FIG. 4 is a cross-sectional view taken along the line B-B of FIG. 2, illustrating a case of interrupting power, and FIG. 5 is a cross-sectional view taken along the line B-B of FIG. 2, illustrating a case of transmitting power.

As shown in FIGS. 1 to 5, the disconnector for a hybrid vehicle according to an embodiment of the present invention includes an upper housing 1 connected to a reducer A, an input shaft 3 installed inside the upper housing 1 and transmitting rotary power of the reducer A, bearings 9 and 10 installed between the upper housing 1 and the input shaft 3, a hub 4 disposed under the input shaft 3, a sleeve 5 having an inner circumferential surface spline-coupled to outer circumferential surfaces of the input shaft 3 and the hub 4 to then be shifted to transmit or interrupt the rotary power of the input shaft 3 to the hub 4, a shift fork 6 coupled to an outer circumferential surface of the sleeve 5 and shifting the sleeve 5, a first spring 12 installed between the upper housing 1 and the shift fork 6, a lower case 2 connected to a lower portion of the upper housing 1, a constant velocity joint B connected to the hub 4 through the inside of the lower case 2, a needle roller 11 installed between the lower case 2 and the constant velocity joint B, an actuator 8 coupled to the inside of the lower case 2 and pushing out the shift fork 6, and a linear sensor 15 sensing a transfer distance of the shift fork 6.

The actuator 8 includes a motor 81 generating rotary power, a lead screw 82 converting a rotary motion of the motor 81 into a linear motion, a cover 84 mounted at a front end of the lead screw 82, a second spring 83 installed between the lead screw 82 and the cover 84, and a position sensor 85 installed to be spaced apart from one side of the lead screw 82.

A reversible motor is used as the motor 81.

Figure 6:
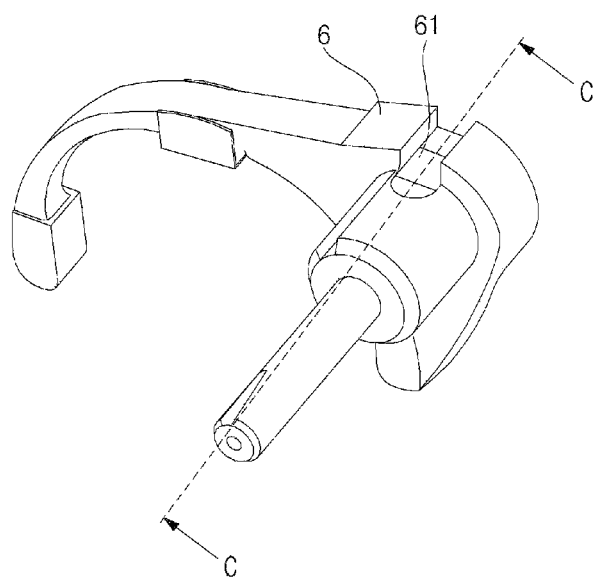
FIG. 6 is a perspective view of a shift fork of the disconnector for a hybrid vehicle shown in FIG. 1.
Figure 7:
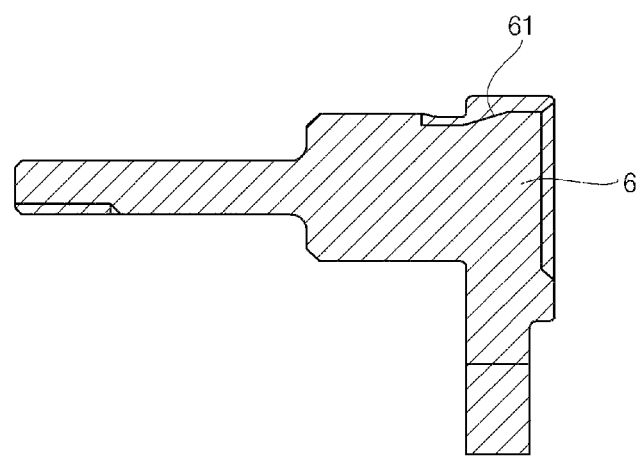
FIG. 7 is a cross-sectional view taken along the line C-C of FIG. 6.

FIG. 6 is a perspective view of a shift fork of the disconnector for a hybrid vehicle shown in FIG. 1 and FIG. 7 is a cross-sectional view taken along the line C-C of FIG. 6.

As shown in FIG. 6, in the disconnector for a hybrid vehicle according to an embodiment of the present invention, the shift fork 6 has an inclined surface 61 formed at a region positioned to correspond to the linear sensor 15.

The aforementioned disconnector for a hybrid vehicle according to an embodiment of the present invention operates as follows.

If power is applied to the actuator 8 to transfer rotary power from the reducer A to the constant velocity joint B, the rotary power is generated from the motor 81 and the lead screw 82 converts a rotary motion of a rotary shaft of the motor 81 into a linear motion to transfer the linear motion to the cover 84. Here, a transfer completion position of the lead screw 82 is sensed by the position sensor 85.

If the lead screw 82 pushes the cover 84, the cover 84 lifts the shift fork 6 while exhibiting a buffering action derived from an elastic force of the second spring 83. Accordingly, the shift fork 6 shifts the sleeve 5 coupled to the hub 4 toward the input shaft 3, thereby commonly coupling the sleeve 5 to the hub 4 and the input shaft 3. Here, the linear sensor 15 is installed at a region corresponding to the inclined surface 61 of the shift fork 6 to measure a transfer distance of the shift fork 6, thereby accurately controlling the transfer distance of the shift fork 6.

If the shift fork 6 shifts the sleeve 5 toward the input shaft 3 in such a manner, the input shaft 3 and the hub 4 separated from each other by the sleeve 5 are coupled to each other, thereby transmitting the rotary power of the reducer A transmitted through the input shaft 3 to the hub 4 to be combined with the rotary power of the constant velocity joint B.

If the motor 81 of the actuator 8 is rotated in the opposite direction to interrupt transmission of the rotary power from the reducer A to the constant velocity joint B, the lead screw 82 returns to its original position. Here, the transfer completion position of the lead screw 82 is sensed by the position sensor 85.

If the lead screw 82 returns to its original position, the shift fork 6 is pushed out by a restoring force of the first spring 12 installed between the upper housing 1 and the shift fork 6, thereby shifting the sleeve 5 commonly coupled to the hub 4 and the input shaft 3 to separate the hub 4 and the input shaft 3 from each other. Here, the transfer distance of the shift fork 6 is measured by the linear sensor 15 installed at the region positioned to correspond to the inclined surface 61 of the shift fork 6, so that a controller (not shown) can accurately control the transfer distance of the shift fork 6.

If the shift fork 6 shifts the sleeve 5 commonly coupled to the hub 4 and the input shaft 3 in the above-described a manner, the input shaft 3 and the hub 4 are separated from each other by the sleeve 5. Accordingly, the rotary power of the reducer A transmitted through the input shaft 3 is not transmitted to the hub 4, so that the constant velocity joint B does not rotate.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A disconnector for a hybrid vehicle, comprising:
  an upper housing connected to a reducer;
  an input shaft installed inside the upper housing and transmitting rotary power of the reducer;
  bearings installed between the upper housing and the input shaft;
  a hub disposed under the input shaft;
  a sleeve having an inner circumferential surface spline-coupled to outer circumferential surfaces of the input shaft and the hub to then be shifted to transmit or interrupt the rotary power of the input shaft to the hub;
  a shift fork coupled to an outer circumferential surface of the sleeve and shifting the sleeve;
  a first spring installed between the upper housing and the shift fork; a lower case connected to a lower portion of the upper housing;
  a constant velocity joint connected to the hub through the inside of the lower case;
  a needle roller installed between the lower case and the constant velocity joint;
  an actuator coupled to the inside of the lower case and pushing out the shift fork, the actuator comprising:
    a motor generating rotary power;
    a lead screw converting a rotary motion into a linear motion;
    a cover mounted at a front end of the lead screw;
    a second spring installed between the lead screw and the cover; and
    a position sensor installed to be spaced apart from one side of the lead screw;
  a linear sensor for measuring a transfer distance of the shift fork, wherein the shift fork has an inclined surface formed at a region positioned to correspond to an end of the linear sensor, so that when the shift fork is transferred the end of the linear sensor can be moved along the inclined surface of the shift fork in a direction perpendicular to a transfer direction of the shift fork, and a distance of movement of the end of the linear sensor is proportional to the transfer distance of the shift fork, wherein the disconnector also comprises a controller controlling the transfer distance of the shift fork.

2. The disconnector of claim 1, further comprising a controller controlling a motor of the actuator of the motor according to the transfer distance of the shift fork measured by the linear sensor.

3. The disconnector of claim 2, wherein the motor is a reversible motor.

4. The disconnector of claim 1, wherein the motor is a reversible motor.

* * * * *